United States Patent
Yokoyama

(10) Patent No.: US 11,299,188 B2
(45) Date of Patent: Apr. 12, 2022

(54) MOVING BODY

(71) Applicant: TOSHIBA TEC KABUSHIKI KAISHA, Tokyo (JP)

(72) Inventor: Yukiko Yokoyama, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 312 days.

(21) Appl. No.: 16/521,696

(22) Filed: Jul. 25, 2019

(65) Prior Publication Data
US 2020/0172140 A1 Jun. 4, 2020

(30) Foreign Application Priority Data
Dec. 3, 2018 (JP) .............................. JP2018-226605

(51) Int. Cl.
*B62B 3/14* (2006.01)
*B62B 5/00* (2006.01)
*G07G 1/00* (2006.01)

(52) U.S. Cl.
CPC .......... *B62B 5/0096* (2013.01); *B62B 3/1412* (2013.01); *B62B 3/1424* (2013.01); *G07G 1/0081* (2013.01)

(58) Field of Classification Search
CPC ... B62B 5/0096; B62B 3/1412; B62B 3/1424; B62B 3/1404; B62B 5/0053; G07G 1/0081; G06Q 20/4015; G06Q 20/3224
See application file for complete search history.

(56) References Cited

U.S. PATENT DOCUMENTS

| | | | | |
|---|---|---|---|---|
| 4,071,740 A | * | 1/1978 | Gogulski | G07G 1/06 235/431 |
| 4,766,297 A | * | 8/1988 | McMillan | G06K 7/10861 235/455 |
| 5,105,070 A | * | 4/1992 | Wike, Jr. | G06K 7/10871 235/462.45 |
| 5,250,789 A | * | 10/1993 | Johnsen | B62B 3/142 705/14.23 |

(Continued)

FOREIGN PATENT DOCUMENTS

| | | |
|---|---|---|
| DE | 20208621 | 8/2002 |
| EP | 3090920 | 11/2016 |

OTHER PUBLICATIONS

Extended European Search Report for European Patent Application No. 19193324.1 dated Aug. 14, 2020.

*Primary Examiner* — Jacob B Meyer
(74) *Attorney, Agent, or Firm* — Amin, Turocy & Watson, LLP

(57) ABSTRACT

According to one embodiment, a moving body includes an electrical component, a base frame that includes caster portions provided to be runnable on a floor surface, and is formed such that a front side is narrower than a rear side along a front-rear direction, the rear side is opened, and thus another moving body is insertable from the rear side, and a battery case that accommodates a battery supplying power to the electrical component and has an opening and closing lid opening rearward. A restricting member is provided inside the base frame and restricts a position of the other moving body inserted from the rear side to a position where the opening and closing lid opens at least to an angle at which the battery in the battery case is replaceable.

20 Claims, 6 Drawing Sheets

(56) References Cited

U.S. PATENT DOCUMENTS

| | | | | |
|---|---|---|---|---|
| 5,314,631 A * | 5/1994 | Katoh | | G06K 7/10871 |
| | | | | 235/462.4 |
| 5,340,973 A * | 8/1994 | Knowles | | G02B 26/106 |
| | | | | 235/462.22 |
| 5,446,272 A * | 8/1995 | Barkan | | G06K 7/10564 |
| | | | | 235/454 |
| 6,343,665 B1 | 2/2002 | Eberlein et al. | | |
| 6,860,427 B1 * | 3/2005 | Schmidt | | G06K 7/10871 |
| | | | | 235/462.32 |
| 7,443,295 B2 | 10/2008 | Brice et al. | | |
| 7,660,747 B2 | 2/2010 | Brice et al. | | |
| 7,679,522 B2 * | 3/2010 | Carpenter | | B62B 3/1424 |
| | | | | 340/688 |
| 7,714,723 B2 * | 5/2010 | Fowler | | G08B 13/248 |
| | | | | 340/572.1 |
| 7,741,808 B2 * | 6/2010 | Fowler | | B62B 3/1428 |
| | | | | 320/107 |
| 7,762,458 B2 * | 7/2010 | Stawar | | G06Q 20/20 |
| | | | | 235/383 |
| 7,782,194 B2 * | 8/2010 | Stawar | | B62B 3/1424 |
| | | | | 340/539.13 |
| 9,230,249 B1 * | 1/2016 | Vora | | G07G 3/00 |
| 9,367,723 B1 * | 6/2016 | Drzymala | | H02J 7/00 |
| 10,438,271 B2 * | 10/2019 | Stawar | | B62B 3/142 |
| 10,949,910 B2 * | 3/2021 | Carpenter | | G06Q 30/0633 |
| 2004/0111320 A1 * | 6/2004 | Schlieffers | | B62B 3/1424 |
| | | | | 705/16 |
| 2005/0035198 A1 * | 2/2005 | Wilensky | | B62B 3/1424 |
| | | | | 235/383 |
| 2005/0082371 A1 * | 4/2005 | Schmidt | | G06K 7/10871 |
| | | | | 235/462.45 |
| 2006/0208072 A1 * | 9/2006 | Ku | | G07G 1/0081 |
| | | | | 235/383 |
| 2006/0256400 A1 * | 11/2006 | Carnevali | | G06K 7/109 |
| | | | | 358/473 |
| 2006/0289637 A1 | 12/2006 | Brice et al. | | |
| 2008/0243626 A1 * | 10/2008 | Stawar | | G06Q 30/02 |
| | | | | 705/23 |
| 2010/0308116 A1 * | 12/2010 | Sani | | G06K 7/10881 |
| | | | | 235/472.01 |
| 2011/0057083 A1 * | 3/2011 | Carnevali | | F16M 13/02 |
| | | | | 248/274.1 |
| 2016/0023872 A1 | 1/2016 | Liu et al. | | |
| 2016/0034055 A1 * | 2/2016 | Utykanski | | G06K 7/10891 |
| | | | | 235/462.13 |
| 2016/0300455 A1 * | 10/2016 | Hutchings | | B62B 3/1424 |
| 2018/0069583 A1 * | 3/2018 | Brownlow | | H04B 1/385 |
| 2018/0330135 A1 * | 11/2018 | Suman | | G06K 19/14 |
| 2019/0073656 A1 * | 3/2019 | Joseph | | G06Q 20/40145 |
| 2019/0270469 A1 * | 9/2019 | Yokoyama | | B62B 5/0096 |
| 2019/0270470 A1 * | 9/2019 | Kurata | | B62B 3/1424 |
| 2019/0272399 A1 * | 9/2019 | Iizaka | | G06K 7/1413 |
| 2019/0272400 A1 * | 9/2019 | Naito | | B62B 3/1412 |
| 2019/0318140 A1 * | 10/2019 | Drzymala | | G06K 7/10831 |
| 2019/0354952 A1 * | 11/2019 | Yokoyama | | G07G 1/0081 |
| 2020/0108851 A1 * | 4/2020 | Hagen | | G06Q 20/322 |
| 2020/0139997 A1 * | 5/2020 | Yokoyama | | G06Q 20/18 |
| 2020/0172140 A1 * | 6/2020 | Yokoyama | | B62B 5/0053 |
| 2020/0198680 A1 * | 6/2020 | Hagen | | B62B 5/0096 |
| 2020/0210982 A1 * | 7/2020 | Lapidos-Salaiz | | G06Q 20/203 |
| 2021/0001741 A1 * | 1/2021 | Miyoshi | | B60L 53/38 |
| 2021/0090052 A1 * | 3/2021 | Maita | | B62B 5/0096 |
| 2021/0174040 A1 * | 6/2021 | Mazzone | | G06K 7/1413 |

* cited by examiner

REAR
FRONT

MOVING BODY

CROSS-REFERENCE TO RELATED APPLICATION

This application is based upon and claims the benefit of priority from Japanese Patent Application No. 2018-226605, filed in Dec. 3, 2018, the entire contents of which are incorporated herein by reference.

FIELD

Embodiments described herein relate generally to a moving body.

BACKGROUND

Customers use shopping carts in stores such as supermarkets and shopping malls. The shopping cart has a so-called stacking structure in which a plurality of shopping carts can be stacked and accommodated in a front-rear direction. Shopping carts are placed in a state of being stacked in a cart storage area of a store.

There is a sales form in which electrical components such as a tablet terminal, in addition to a scanner that reads a commodity code attached to a commodity, are provided on this shopping cart, and a customer himself or herself is allowed to read a commodity code attached to a commodity. Such a shopping cart is equipped with a battery for supplying power to the electrical components, in addition to the above-described electrical components.

As such a battery, there is a type of battery that is detachably accommodated in a battery case fixed to a shopping cart. With such a type of battery, for example, a clerk performs a replacement operation after the end of business. The clerk opens the lid of the battery case in the shopping cart and takes out the accommodated battery. Then, the clerk charges the battery and returns the battery to the inside of the battery case before the start of business.

At this time, if the stacked shopping carts are too close in the front-rear direction, depending on the position of the battery case, the lid may not be opened sufficiently, and thus the replacement of the battery cannot be performed. For this reason, the clerk opens and closes the battery case by shifting the stacked shopping carts in the front-rear direction to a position where the lid of the battery case can be opened for the replacement operation.

For this reason, moving bodies capable of securing a space for performing the replacement operation of the battery even when moving bodies such as shopping carts are stacked are desired.

DETAILED DESCRIPTION

Embodiments provide a moving body in which a battery replacement operation can be performed by opening a lid of a battery case, even when stacked in a front-rear direction.

In general, according to one embodiment, the moving body includes an electrical component, a base frame that includes caster portions provided to be runnable on a floor surface, and is formed such that a front side is narrower than a rear side along a front-rear direction, the rear is opened, and thus another moving body is insertable from the rear side, and a battery case that accommodates a battery supplying power to the electrical component and has an opening and closing lid opening rearward. A restricting member is provided inside the base frame and restricts a position of the other moving body inserted from the rear side to a position where the opening and closing lid opens at least to an angle at which the battery in the battery case is replaceable.

Hereinafter, the present embodiment will be described with reference to drawings. As an example of a moving body, a shopping cart which can also be used as a registration machine having a scanner or the like used in retail stores such as supermarkets will be exemplified.

Figure 1:
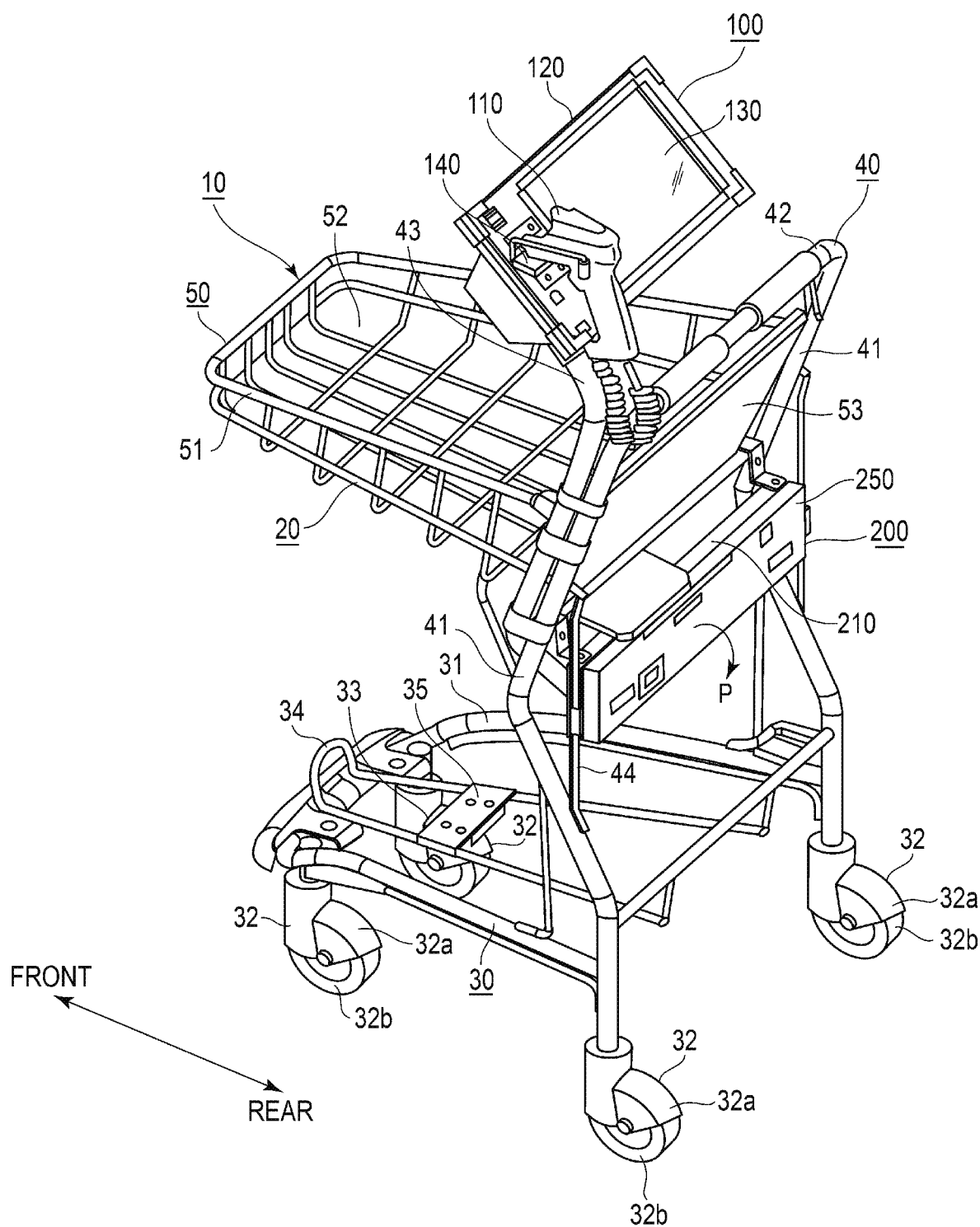
FIG. 1 is an external perspective view showing a shopping cart according to an embodiment.
Figure 2:
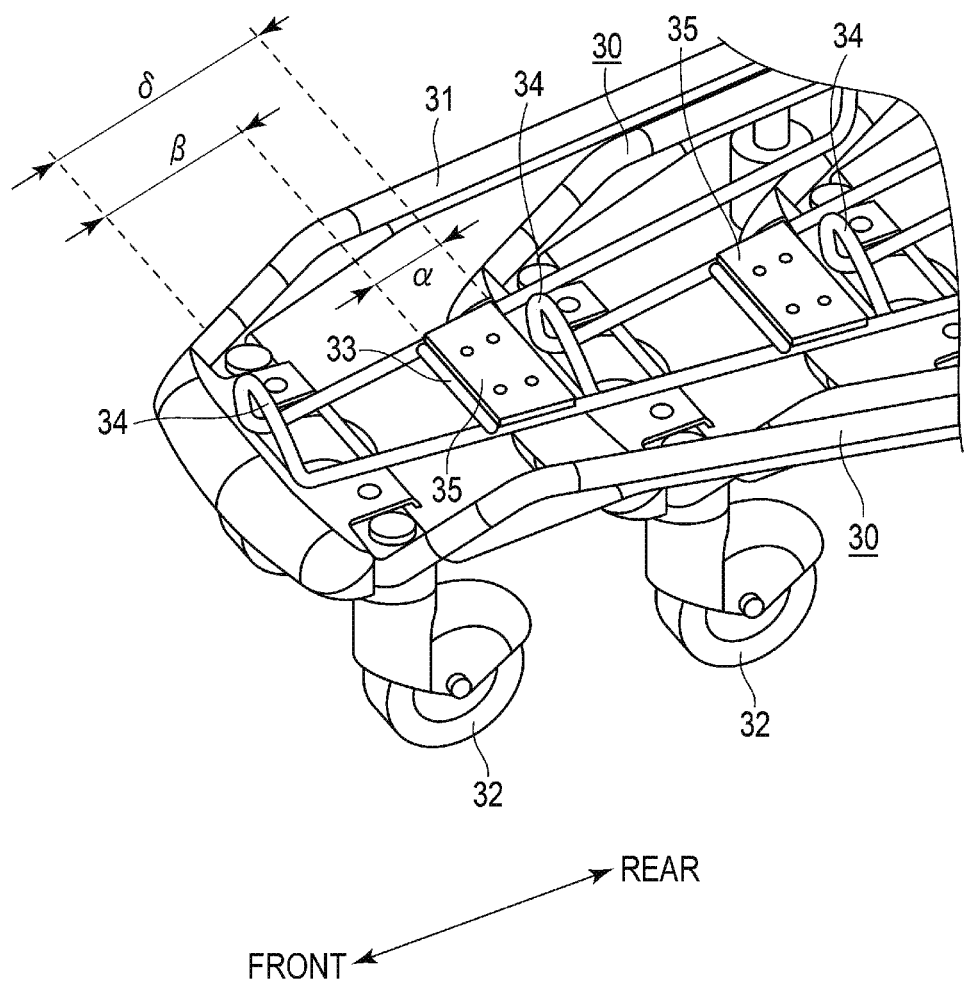
FIG. 2 is a perspective view showing a main part of a base frame incorporated in the shopping cart.
Figure 3:
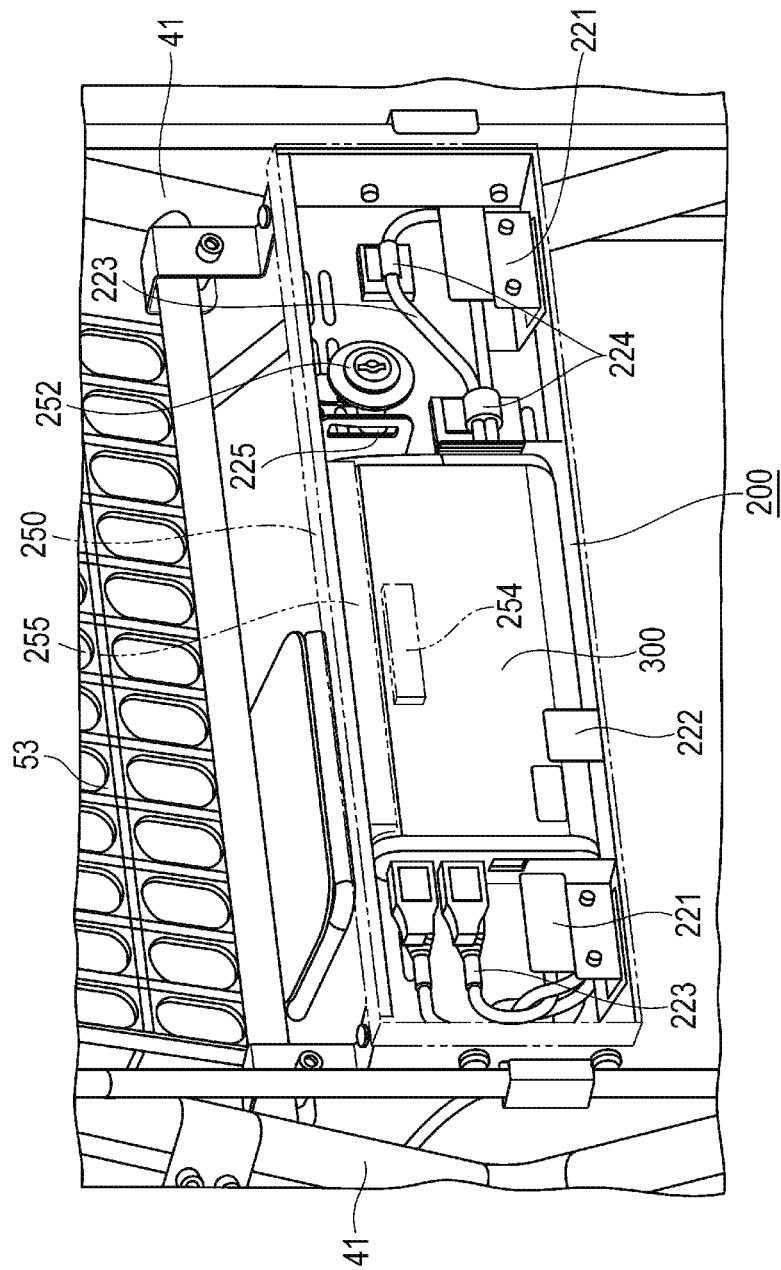
FIG. 3 is an external perspective view showing a battery unit incorporated in the shopping cart.
Figure 4:
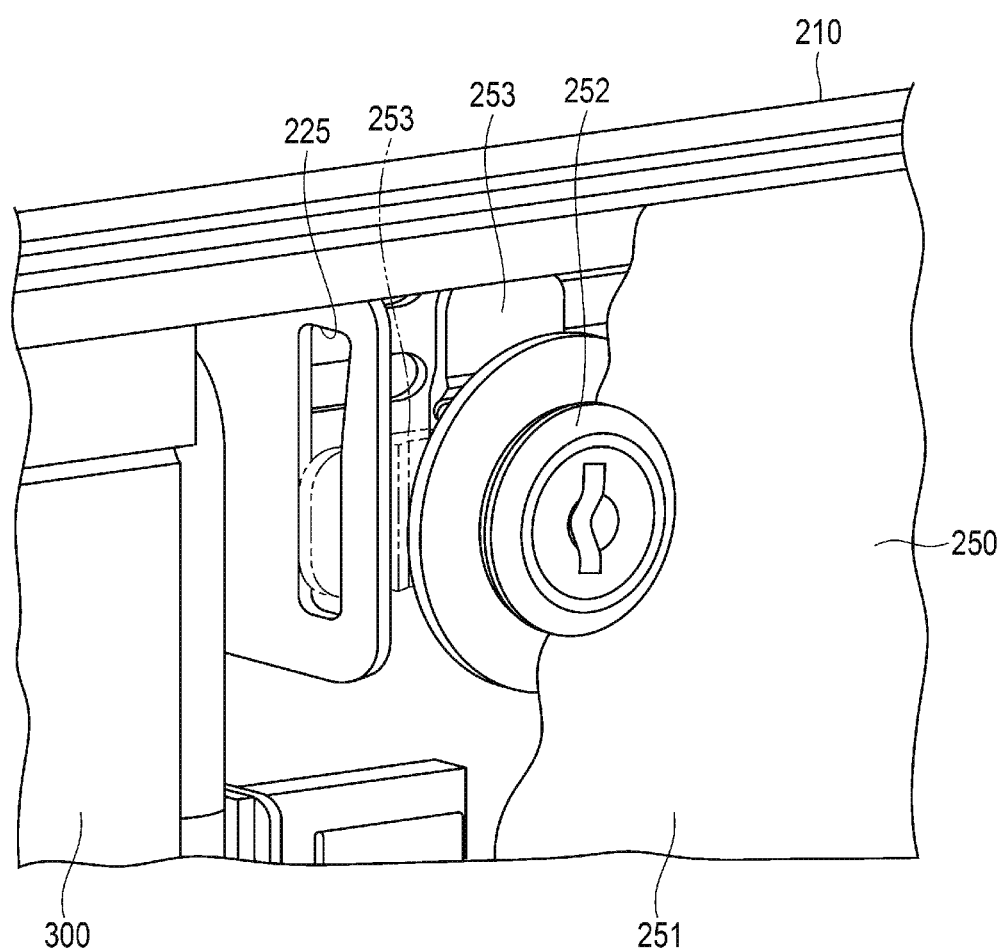
FIG. 4 is an external perspective view showing a main part of the battery unit incorporated in the shopping cart.
Figure 5:
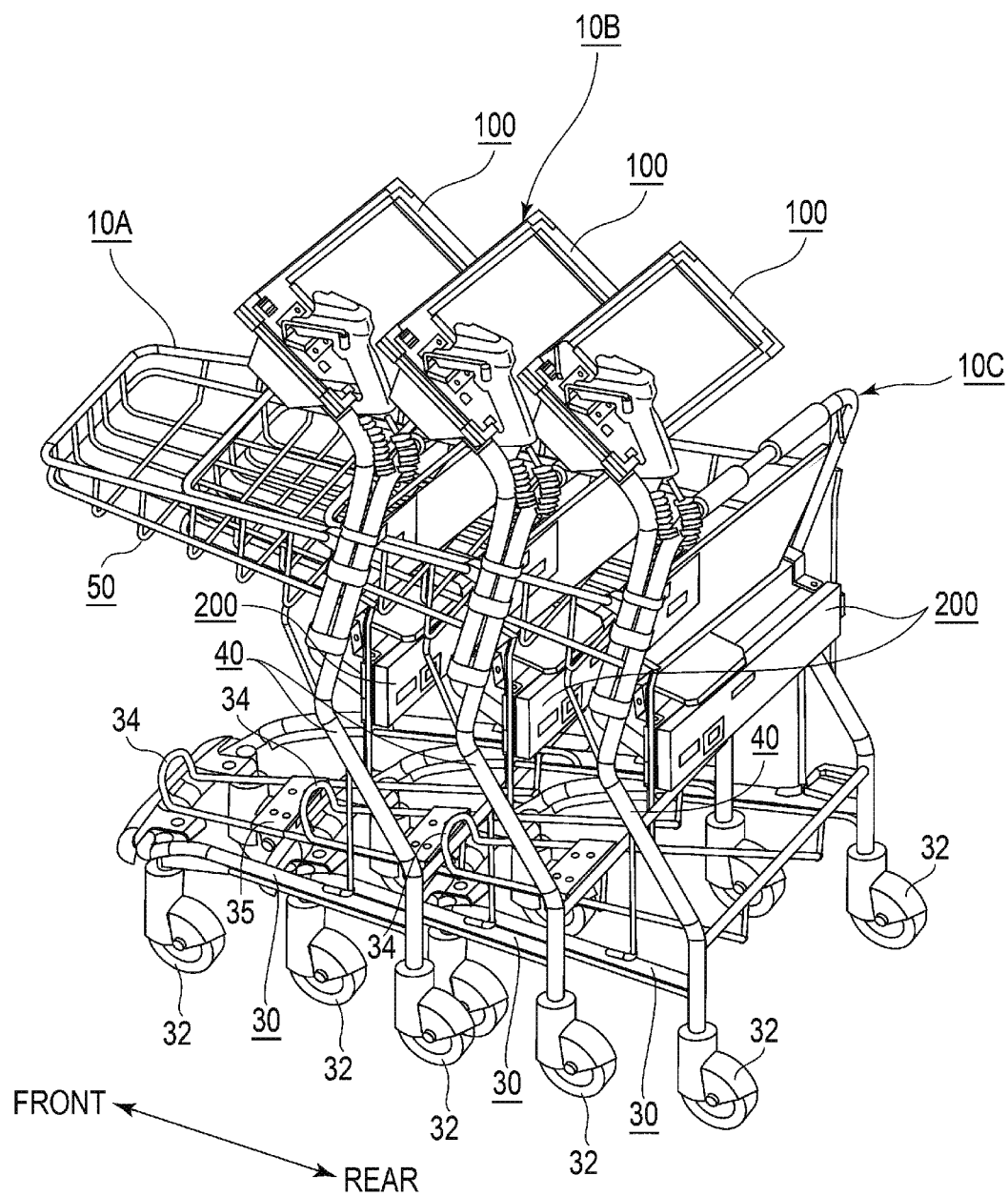
FIG. 5 is an external perspective view showing a state in which the shopping carts are stacked.
Figure 6:
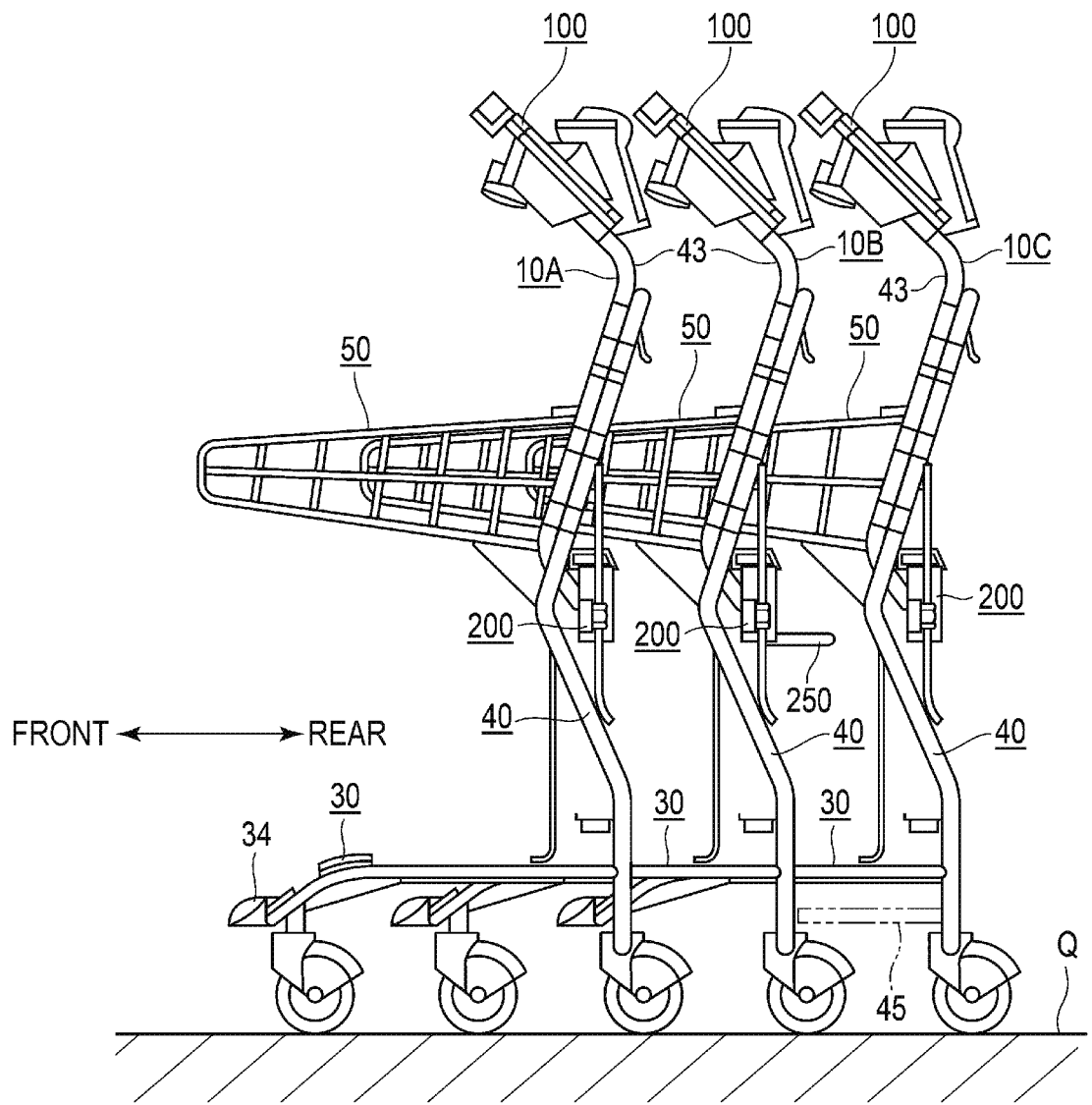
FIG. 6 is a side view showing a state in which the shopping carts are stacked.
Figure 7:
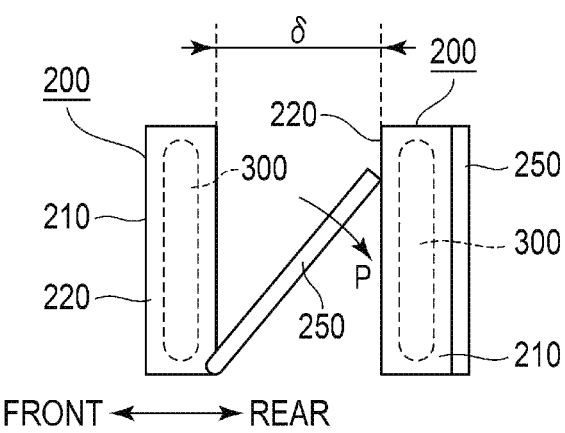
FIG. 7 is a schematic view showing a positional relationship between an opening and closing lid of a battery unit incorporated in a front side shopping cart and a battery unit of a rear side shopping cart.

FIG. 1 is an external perspective view showing a shopping cart 10 according to an embodiment, FIG. 2 is a perspective view showing a main part of a base frame 30 incorporated in the shopping cart 10, FIG. 3 is an external perspective view showing a battery unit 200 incorporated in the shopping cart 10, FIG. 4 is an external perspective view showing a main part of the battery unit 200 incorporated in the shopping cart 10, FIG. 5 is an external perspective view showing a state in which the shopping carts 10 are stacked, FIG. 6 is a side view showing a state in which the shopping carts 10 are stacked, and FIG. 7 is a schematic view showing a positional relationship between an opening and closing lid 250 of the battery unit 200 incorporated in the shopping cart 10 on the front side and the battery unit 200 of the shopping cart 10 on the rear side. In FIG. 6, Q indicates a floor surface. In the present embodiment, a handle frame portion 40 side is the rear side, and a projecting direction of a basket tray portion 50 projecting from the handle frame portion 40 is the front side. The front side and the rear side are collectively called a front-rear direction.

In the embodiment, stacking indicates that a plurality of shopping carts 10 are accommodated by arranging the plurality of shopping carts 10 in a line along the front-rear direction and pushing the tip end side of the shopping cart 10 located on the rear side to the rear side, that is, the handle frame portion 40 side of the shopping cart 10 located on the front side as shown in FIGS. 5 and 6. The shopping cart 10 has a structure in which a part on the rear side is opened, and even when a plurality of shopping carts 10 are arranged, the overall length along the front-rear direction may be shortened, thereby improving the accommodation efficiency of the shopping carts 10 at the time of stacking.

As shown in FIG. 1, the shopping cart 10 according to the present embodiment includes a cart portion 20 for transporting a shopping basket accommodating commodities, a commodity registration unit (electrical component) 100 attached to the cart portion 20, and the battery unit 200 that supplies power to the commodity registration unit 100. The cart portion 20 is configured to change the position of a restricting plate 35 or a restricting protrusion portion 45 according to the type or the installation position of the commodity registration unit 100 and the battery unit 200.

The cart portion 20 includes the base frame 30 for smoothly moving on the floor surface, the handle frame portion 40 erected on the rear wheel side of the base frame 30, and the basket tray portion 50 provided forward from the midway portion of the handle frame portion 40. The base frame (lower mounting portion) 30 and the basket tray portion (upper mounting portion) 50 are configured such that a shopping basket (not shown) can be appropriately placed thereon.

The base frame 30 is provided with a frame 31 which is narrower at the front than at the rear and is opened at the rear, and into which another moving body can be inserted from the rear side, and casters 32 provided at four corners of the frame 31. The caster 32 is provided with a bracket 32a that freely rotates around an axis in a vertical direction, and a wheel 32b that freely rotates in a horizontal direction on the bracket 32a and is made of rubber or resin. The frame 31 is provided with a receiving portion 33 made of a thin frame material. The receiving portion 33 is formed in such a size that a lower portion of the shopping basket fits. An abutting portion 34 is formed at the tip end of the base frame 30. The abutting portion 34 supports the shopping basket and has a function of restricting an interval between the shopping carts 10 by abutting on the receiving portion 33 of the front shopping cart 10 when the plurality of shopping carts 10 are stacked. The interval is set to the dimension for securing an interval that the casters 32 of the front and rear shopping carts 10 do not collide.

The restricting plate 35 is bolted to the receiving portion 33 and may be detached as required. The position of the restricting plate 35 in the front-rear direction is determined as described later.

The handle frame portion 40 includes vertical frames 41 and 41 attached to the rear casters 32 respectively, and a horizontal handle bar 42 connecting upper ends of the vertical frames 41 and 41. An extension arm 43 is attached to the left vertical frame 41. A reinforcing member 44 is attached to the handle frame portion 40.

The basket tray portion 50 has a rectangular frame-shaped frame 51 and a receiving portion 52 provided below the frame 51. The receiving portion 52 is formed in such a size that the lower portion of the shopping basket fits. The rear end of the basket tray portion 50 has a flip-up plate 53 which is flipped up to the front side.

The commodity registration unit 100 is attached to the upper end of the extension arm 43. The commodity registration unit 100 includes a hand scanner 110 that reads a commodity code, and a tablet case 120. A tablet terminal 130 is provided inside the tablet case 120. The tablet terminal 130 has a display for displaying various pieces of information such as the commodity name and unit price of the commodity read by the hand scanner 110. A scanner holder 140 for detachably holding the hand scanner 110 is provided on the surface of the tablet case 120.

The battery unit 200 accommodates a battery 300. The battery 300 supplies power to the commodity registration unit 100 via a power line built in the handle frame portion 40. The battery unit 200 includes a thin rectangular parallelepiped battery case 210 attached to the lower end side of the handle frame portion 40 across the vertical frames 41 and 41.

The battery case 210 is provided with a case body 220 and the opening and closing lid 250 that swings around an axis in a horizontal direction by a hinge 221 at the lower end with respect to the case body 220 and opens in a P direction in FIG. 1. In FIG. 3, the opening and closing lid 250 is indicated by a two-dot chain line.

As shown in FIG. 3, the case body 220 includes an engaging portion 222 engaged with the battery 300, a power cable 223 detachably connected to the battery 300, and a fixing piece 224 fixing the power cable 223. Further, the case body 220 is provided with an engaging hole 225 with which a swinging piece 253 described later engages.

The opening and closing lid 250 includes a plate-like lid body 251 and a lock mechanism 252 attached to the lid body 251. The lock mechanism 252 is provided with the swinging piece 253 that can rotate in a range of 90 degrees inside the lid body 251. The swinging piece 253 rotates in a range of 90 degrees by inserting a key from the lid body 251 side. The swinging piece 253 is disengaged when positioned upward as shown in FIG. 4 and engaged with the engaging hole 225 when positioned laterally.

On the inner wall side of the lid body 251, a sponge (elastic body) 254 which is pressed by the battery 300 when closed and a holding jig 255 which holds the upper portion of the battery 300 are attached.

These configurations constitute the shopping cart 10 as a registration machine that reads the commodity code of the commodity that a customer wants to purchase. Such shopping carts 10 are stacked and accommodated as shown in FIGS. 5 and 6. At this time, the interval in the front-rear direction of the shopping carts 10 is adjusted by the mounting position of the restricting plate 35. Here, a method of determining the mounting position of the restricting plate 35 will be described. When the shopping carts 10 are stacked, the restricting plate 35 is for opening the opening and closing lid 250 of the battery case 210 at least to an angle for securing an operation space, in the replacement of the battery 300.

If the shopping cart 10 has a configuration in which the battery unit 200 is not mounted, the shopping carts 10 may be packed in the front-rear direction to a position where the casters 32 do not interfere when being stacked. The difference between positions of the front shopping cart 10 and the rear shopping cart 10 in the front-rear direction at this time is a dimension β. This dimension β is the distance between the receiving portion 33 and the abutting portion 34 shown in FIG. 2. On the other hand, as shown in FIG. 7, the relative position in the front-rear direction that allows the opening and closing lid 250 to be opened to the minimum opening angle necessary for the replacement operation of the battery 300, that is, the difference between positions of the front shopping cart 10 and the rear shopping cart 10 in the front-rear direction is a dimension δ.

In order to secure an interval of the dimension δ, which is the difference between positions of the front shopping cart 10 and the rear shopping cart 10 in the front-rear direction, the restricting plate 35 on which the abutting portion 34 abuts is installed behind the receiving portion 33. A dimension α of the restricting plate 35 in the front-rear direction is a difference between the dimension β and the dimension δ because the dimension β is already set between the receiving portion 33 and the abutting portion 34.

The shopping cart 10 configured in this way is used as follows. Since there are a plurality of shopping carts 10 in FIGS. 5 and 6, a shopping cart on a front side will be described as a shopping cart 10A, a shopping cart on a rear side will be described as a shopping cart 10B, and a shopping cart on a further rear side will be described as a shopping cart 10C. A plurality of shopping carts 10 (10A, 10B, and 10C) are prepared, and arranged in a line and stacked at the entrance of the store, and the like. At this time, as shown in FIGS. 5 and 6, the base frame 30 of the rear shopping cart 10B is pushed forward from the rear side of the base frame 30 of the shopping cart 10A located on the front side. Since there is no frame on the rear side of the base frame 30, the base frame 30 of the shopping cart 10B is inserted by flipping the flip-up plate 53 from the rear side of the base frame 30 of the shopping cart 10A. In addition, the basket tray portion 50 of the shopping cart 10B also overlaps the basket tray portion 50 of the shopping cart 10A through the space between the vertical frames 41 and 41.

Similarly, as shown in FIGS. 5 and 6, by pushing the shopping cart 10C forward as well, it is possible to improve the accommodation efficiency of the entire shopping carts 10.

The battery unit 200 is installed in each shopping cart 10, and the replacement operation of the battery 300 is needed. As for the replacement operation of the battery 300, a clerk performs replacement operation after the end of business. The clerk inserts a key into the lock mechanism 252 of the battery case 210 of the stacked shopping cart and rotates the key by 90 degrees clockwise. Thereby, the swinging piece 253 is disengaged from the engaging hole 225. The opening and closing lid 250 is energized in an opening direction by the elastic force of the sponge 254 pressed to the battery 300 side and is opened by the own weight thereof. For this reason, the labor of the clerk for operations can be reduced. At this time, when the opening and closing lid 250 of the shopping cart 10A is opened, the opening and closing lid 250 abuts on the battery unit 200 of the shopping cart 10B and cannot be opened any more. The opening angle of the opening and closing lid 250 at this time is an angle at which a space that does not interfere with both the operation of removing the battery 300 from the power cable 223 and the operation of taking out the battery 300 from the engaging portion 222 may be secured. The clerk takes out the accommodated battery 300 and disconnects the power cable 223. The clerk closes the opening and closing lid 250, removes the key from the lock mechanism 252, and performs the battery replacement operation of the next shopping cart 10.

Then, the clerk charges the battery 300 taken out by a charger and returns the battery 300 into the battery case 210 before the start of business. Also at this time, the clerk opens the opening and closing lid 250, connects the power cable 223 to the battery 300, and fixes the battery 300 to the engaging portion 222. Then, the clerk closes the opening and closing lid 250. At this time, the side surface of the battery 300 is elastically held by the sponge 254 provided on the opening and closing lid 250. Further, the upper surface of the battery 300 is held by the holding jig 255. By these, even when passing through the uneven floor surface while the shopping cart 10 is moving, it is possible to prevent generation of abnormal noise due to interference between the battery 300 and the opening and closing lid 250.

As described above, the clerk does not need to move the shopping cart 10 in the front-rear direction in order to fully open the opening and closing lid 250 at the time of the replacement operation of the battery 300, and the operation efficiency can be improved. Further, since the front-rear direction of the stacked shopping carts 10 can be brought close to a range that does not interfere with the battery replacement operation, it is possible to minimize the reduction in the accommodation efficiency of the shopping carts 10.

In addition, since the lock mechanism 252 is formed on the opening and closing lid 250, a shopper who does not have a key or a clerk unrelated to battery replacement does not accidentally open the opening and closing lid 250, and theft can be prevented.

Since the shopping cart 10 is configured in this manner, even when stacking the plurality of shopping carts 10, in the replacement of the battery 300 of the mounted battery unit 200, the opening and closing lid 250 of the battery case 210 may be opened to an angle sufficient for the replacement operation. In addition, a general shopping cart without the attached battery unit 200 corresponds to the cart portion 20 of the shopping cart 10. Therefore, it is possible to use the general shopping cart as the shopping cart 10 only by attaching the commodity registration unit 100, the battery unit 200, and the restricting plate 35, and there is no need to prepare a special shopping cart again. Therefore, the existing shopping cart may be used, and it is possible to reduce the manufacturing cost of the shopping cart 10.

In the embodiment described above, the restricting plate 35 as a restricting member is provided on the base frame 30, but if it is possible to restrict the interval between the front and rear shopping carts 10, the restricting plate 35 may be provided in a portion other than the base frame 30. For example, as shown in FIG. 6, the base frame 30 includes the frame 31 formed so as to be insertable into another front shopping cart 10, and the restricting protrusion portion (restricting member) 45 may be provided on the vertical frame 41 provided upward from the rear end of the frame 31. The length of the restricting protrusion portion 45 is set to allow the opening and closing lid 250 of the battery case 210 of the front shopping cart 10 to be opened to an angle at which the battery is replaceable.

The mounting position of the battery unit 200 may be a position that does not get in the way when stacking the shopping carts 10. Specifically, the battery case 210 can be provided above the base frame 30 with respect to the floor surface Q and below the basket tray portion 50 or above the basket tray portion 50. For example, the battery case 210 may be attached to the handle bar 42 or the extension arm 43.

Furthermore, although the shopping cart was illustrated as a moving body, an inventory control cart for a warehouse or the like may be also used. In addition, although the commodity registration unit was illustrated as an electrical component, a card reader, a camera, or the like may be included.

In addition to the above-described position where the battery replacement operation can be performed, the position of the restricting plate 35 or the restricting protrusion portion 45 may be set on the basis of the position where the commodity registration units 100 of the shopping carts 10 located at the front and rear are prevented from contacting each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A moving body including an electrical component, the moving body comprising:
   a base frame comprising caster portions runnable on a floor surface, wherein a front side is narrower than a rear side along a front-rear direction, the rear side is openable, so that another moving body is insertable therein from the rear side;
   a battery case that accommodates a battery supplying power to the electrical component and includes an opening and closing lid opening rearward; and
   a restricting member positioned inside the base frame and restricts a position of the another moving body inserted from the rear side to a position where the opening and closing lid opens at least to an angle at which the battery in the battery case is replaceable without moving the another moving body when fully inserted into the moving body from the rear side.

2. The moving body according to claim 1, further comprising:
   a vertical frame positioned upward from a rear end of the base frame;
   a lower mounting portion positioned on the base frame and configured for mounting a commodity; and
   an upper mounting portion positioned on a front side of the vertical frame and configured for mounting a commodity.

3. The moving body according to claim 2, wherein the battery case is provided above the lower mounting portion with respect to the floor surface, and below the upper mounting portion or above the upper mounting portion.

4. The moving body according to claim 3, wherein the battery case is attached to the vertical frame.

5. The moving body according to claim 1, wherein the opening and closing lid is configured to close and lock with a lock mechanism and unlocked by a key.

6. The moving body according to claim 1, wherein the battery case or the opening and closing lid is provided with an energizing member for energizing the opening and closing lid in an opening direction.

7. The moving body according to claim 1, wherein the electrical component is a commodity identification device or a display device for identifying a commodity.

8. A moving body including an electrical component, the moving body comprising:
   a base frame comprising caster portions runnable on a floor surface, wherein a front side is narrower than a rear side along a front-rear direction and the rear side is openable, wherein the front side is insertable into a rear side of another identical moving body;
   a vertical frame positioned upward from a rear end of the base frame;
   a battery case that accommodates a battery supplying power to the electrical component and includes an opening and closing lid opening rearward; and
   a restricting member positioned forward of the vertical frame and restricts a position of the moving body to a position where an opening and closing lid of a battery case of the another moving body opens to an angle at which the is replaceable without moving the at which a battery moving body when fully inserted into the another moving body at the front of the moving body.

9. The moving body according to claim 8, further comprising:
   a lower mounting portion positioned on the base frame and configured for mounting a commodity; and
   an upper mounting portion positioned on a front side of the vertical frame and configured for mounting a commodity.

10. The moving body according to claim 9, wherein the battery case is provided above the lower mounting portion with respect to the floor surface, and below the upper mounting portion or above the upper mounting portion.

11. The moving body according to claim 10, wherein the battery case is attached to the vertical frame.

12. The moving body according to claim 8, wherein the opening and closing lid is configured to close and lock with a lock mechanism and unlocked by a key.

13. The moving body according to claim 8, wherein the battery case or the opening and closing lid is provided with an energizing member for energizing the opening and closing lid in an opening direction.

14. The moving body according to claim 8, wherein the electrical component is a commodity identification device or a display device for identifying a commodity.

15. A shopping cart including an electrical component for processing a commodity, comprising:
   a base frame comprising caster portions runnable on a floor surface, wherein a front side is narrower than a rear side along a front-rear direction, the rear side is openable, so that another shopping cart is insertable therein from the rear side;
   a battery case that accommodates a battery supplying power to the electrical component and includes an opening and closing lid opening rearward; and
   a restricting member positioned inside the base frame and restricts a position of the another shopping cart inserted from the rear side to a position where the opening and closing lid opens at least to an angle at which the battery in the battery case is replaceable without moving the another shopping cart when fully inserted into the shopping cart from the rear side.

16. The shopping cart according to claim 15, further comprising:
   a vertical frame positioned upward from a rear end of the base frame;
   a lower mounting portion positioned on the base frame and configured for mounting a commodity; and
   an upper mounting portion positioned on a front side of the vertical frame and configured for mounting a commodity.

17. The shopping cart according to claim 16, wherein the battery case is provided above the lower mounting portion with respect to the floor surface, and below the upper mounting portion or above the upper mounting portion.

18. The shopping cart according to claim 17, wherein the battery case is attached to the vertical frame.

19. The shopping cart according to claim 15, wherein the opening and closing lid is configured to close and lock with a lock mechanism and unlocked by a key.

20. The shopping cart according to claim 15, wherein the battery case or the opening and closing lid is provided with an energizing member for energizing the opening and closing lid in an opening direction.

* * * * *